(12) United States Patent
Druckenmueller et al.

(10) Patent No.: US 8,801,408 B2
(45) Date of Patent: Aug. 12, 2014

(54) PISTON PUMP FOR A VEHICLE BRAKE SYSTEM

(75) Inventors: Heiko Druckenmueller, Steinheim A.D. Murr (DE); Oliver Schmautz, Oberstenfeld (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 12/515,197

(22) PCT Filed: Sep. 26, 2007

(86) PCT No.: PCT/EP2007/060210
§ 371 (c)(1),
(2), (4) Date: Nov. 2, 2009

(87) PCT Pub. No.: WO2008/058801
PCT Pub. Date: May 22, 2008

(65) Prior Publication Data
US 2010/0083821 A1    Apr. 8, 2010

(30) Foreign Application Priority Data
Nov. 16, 2006 (DE) .......................... 10 2006 054 061

(51) Int. Cl.
*F04B 19/00* (2006.01)

(52) U.S. Cl.
USPC .............................. 417/470; 417/549; 91/422

(58) Field of Classification Search
USPC .............................. 417/470, 545–554; 91/422
See application file for complete search history.

(56) References Cited

U.S. PATENT DOCUMENTS

| 6,224,352 B1 * | 5/2001 | Hauser et al. ................. 417/313 |
| 6,457,956 B1 * | 10/2002 | Hauser et al. ................. 417/470 |
| 2007/0092389 A1 | 4/2007 | Dinkel et al. |

FOREIGN PATENT DOCUMENTS

| CN | 1748084 A | 3/2006 |
| DE | 4326389 A1 | 2/1995 |
| DE | 197 32 771 A1 | 2/1999 |
| DE | 197 53 083 A1 | 2/1999 |
| DE | 19930608 A1 | 1/2000 |
| DE | 198 54 719 A1 | 5/2000 |
| DE | 100 22 811 A1 | 11/2001 |
| DE | 101 12 618 A1 | 9/2002 |
| GB | 637679 | 5/1950 |
| JP | 2006274996 A | 10/2006 |
| WO | 2004072478 A1 | 8/2004 |
| WO | WO-2004072478 A1 * | 8/2004 ............... F04B 1/04 |
| WO | 2006013142 A1 | 2/2006 |

* cited by examiner

*Primary Examiner* — Devon Kramer
*Assistant Examiner* — Thomas Fink
(74) *Attorney, Agent, or Firm* — Maginot, Moore & Beck

(57) ABSTRACT

The invention relates to a piston pump for a motor vehicle braking system having a housing section and a piston guided displaceably in the housing section. The invention further has an intake valve having a valve seat arranged on the piston. The valve seat is configured as a circular sealing edge. A spherical valve body of the intake valve seals against the spherical sealing edge.

6 Claims, 3 Drawing Sheets

PISTON PUMP FOR A VEHICLE BRAKE SYSTEM

CROSS-REFERENCE TO RELATED APPLICATION

This application is a 35 USC 371 application of PCT/EP 2007/060210 filed on Sep. 26, 2007.

BACKGROUND OF THE INVENTION

1. Field of the Invention

The invention relates to a piston pump for a vehicle brake system, having a housing portion and a piston that is dispiaceably guided in the housing portion and has an inlet valve with a sealing seat embodied on the piston.

2. Description of the Prior Art

The piston pumps used for known vehicle brake systems, particularly anti-lock brake systems (ABS), serve to control the pressure in wheel brake cylinders. In the ABS, the piston pumps are provided for instance for returning brake fluid from one or more wheel brake cylinders to a master cylinder. The ABS often functions in combination with traction control (TC). Another known system, called an electronic stability program (ESP), improves driving safety by a further increment compared to ABS and TC. Wile ABS and TC function in the longitudinal direction of travel, ESP has an influence on transverse dynamics and therefore in principle is transverse traction control. For all these systems as well a further systems for increasing driving safety, piston pumps are employed.

Known piston pumps provided for vehicle brake systems comprise among other components a cylinder, which is embodied in a housing and in which a piston is received longitudinally movably. The piston drive is usually effected via an eccentric element, at which the rotary motion of a shaft driven by means of an electric motor is converted into a translational motion of a piston rod of the piston. The piston rod is pressed with its face end against the outer circumference of the eccentric element by means of a prestressing element, for instance in the form of a helical spring. Thus in the final analysis, a reciprocating pumping motion of the piston can be attained.

Known piston pumps furthermore as a rule have an inlet valve embodied as a seat valve, for controlling the inflow of fluid. The inflow of fluid from outside the piston pump through the inlet valve is effected in known piston pumps via a suction line, which has a comparatively high flow resistance. As a consequence, known piston pumps used for vehicle brake systems do not have sufficiently effective pressure buildup dynamics, since because of the high flow resistance, they can be filled only relatively slowly.

It is the object of the invention to create a piston pump of the type defined at the outset, in which the aforementioned problems are overcome and which have high pressure buildup dynamics.

SUMMARY OF THE INVENTION

According to the invention, a piston pump is created for a vehicle brake system, having a housing portion and a piston, which piston is guided displaceably in the housing portion and has an inlet valve with a sealing seat embodied on the piston. Also in the piston pump of the invention, the sealing seat is configured as a circular sealing edge, against which a spherical valve body of the inlet valve provides sealing.

In the piston pump of the invention, the sealing seat of the inlet valve is configured by means of a sealing edge, against which a ball, as a valve body, provides sealing. In this kind of inlet valve, the sealing diameter is determined solely by the diameter of the associated sealing seat bore, and not by the contact diameter of the ball against a conical seat as is the case in known inlet valves. According to the invention, with a comparatively large sealing seat bore with correspondingly little flow resistance, a small contact diameter of the ball can therefore still be achieved. This small contact diameter means that the ball lifting from the sealing seat, for the same ball stroke, opens up a larger area through which fluid can flow than is the case with a large contact diameter. It is true that with known inlet valves, a larger area through which fluid can flow could be achieved, but the ball stroke would have to be longer for that purpose. That, however, would have an adverse effect on the dynamics of the inlet valve, and the valve would in particular close more slowly.

According to the invention, in the piston pump of the invention, the diameter of the circular sealing edge is configured to be preferably between 75% and 90%, and especially preferably 83%, of the diameter of the associated spherical valve body of the inlet valve. With this kind of size of the circular sealing edge, the medium flowing through the inlet valve is carried fluidically with an especially slight pressure drop.

Also preferably, the piston is configured with a piston disk portion in which a circular-cylindrical supply conduit portion, forming the circular sealing edge, for brake fluid is embodied. By means of this kind of supply conduit portion, embodied in a piston disk portion and thus especially short, the sealing edge provided according to the invention can be manufactured especially precisely and at the same time economically.

Moreover, preferably, the piston is configured with a piston rod portion, oriented toward an eccentric drive, and with a piston disk portion forming the circular sealing edge; in the piston rod portion, a longitudinally oriented first supply conduit portion for brake fluid is formed, and in the piston disk portion, a second supply conduit portion adjoining the first in the flow direction and forming the circular sealing edge is formed. At the second supply conduit portion, the cross-sectional area through which brake fluid flows is configured to be smaller than the corresponding cross-sectional area of the first supply conduit portion. Because of this configuration, with respect to the medium it is to carry, the piston disk portion with its supply conduit portion is a flow portion which although narrow is also in particular shorter; therefore in hydraulic terms, this portion is a baffle.

The longitudinally oriented first supply conduit portion embodied in the piston rod portion is preferably configured by means of an axial bore and at least one radial bore. Viewed in cross section, this supply conduit portion can be configured with a comparatively large area and thus fluidically especially favorably.

The longitudinally oriented first supply conduit portion embodied in the piston rod portion can alternatively also be configured economically and at the same time with a large volume by means of a radially and axially extending slit.

With a view to the aforementioned kinds of configuration, the piston of the invention is especially preferably configured in two parts; with one part of the piston, the piston rod portion oriented toward the eccentric drive is configured, and with the second part of the piston, the piston disk portion forming the circular sealing edge is configured.

BRIEF DESCRIPTION OF THE DRAWINGS

Below, exemplary embodiments of a piston pump according to the invention will be described in further detail in conjunction with the accompanying schematic drawings, in which.

DESCRIPTION OF THE PREFERRED EMBODIMENT

Figure 1:
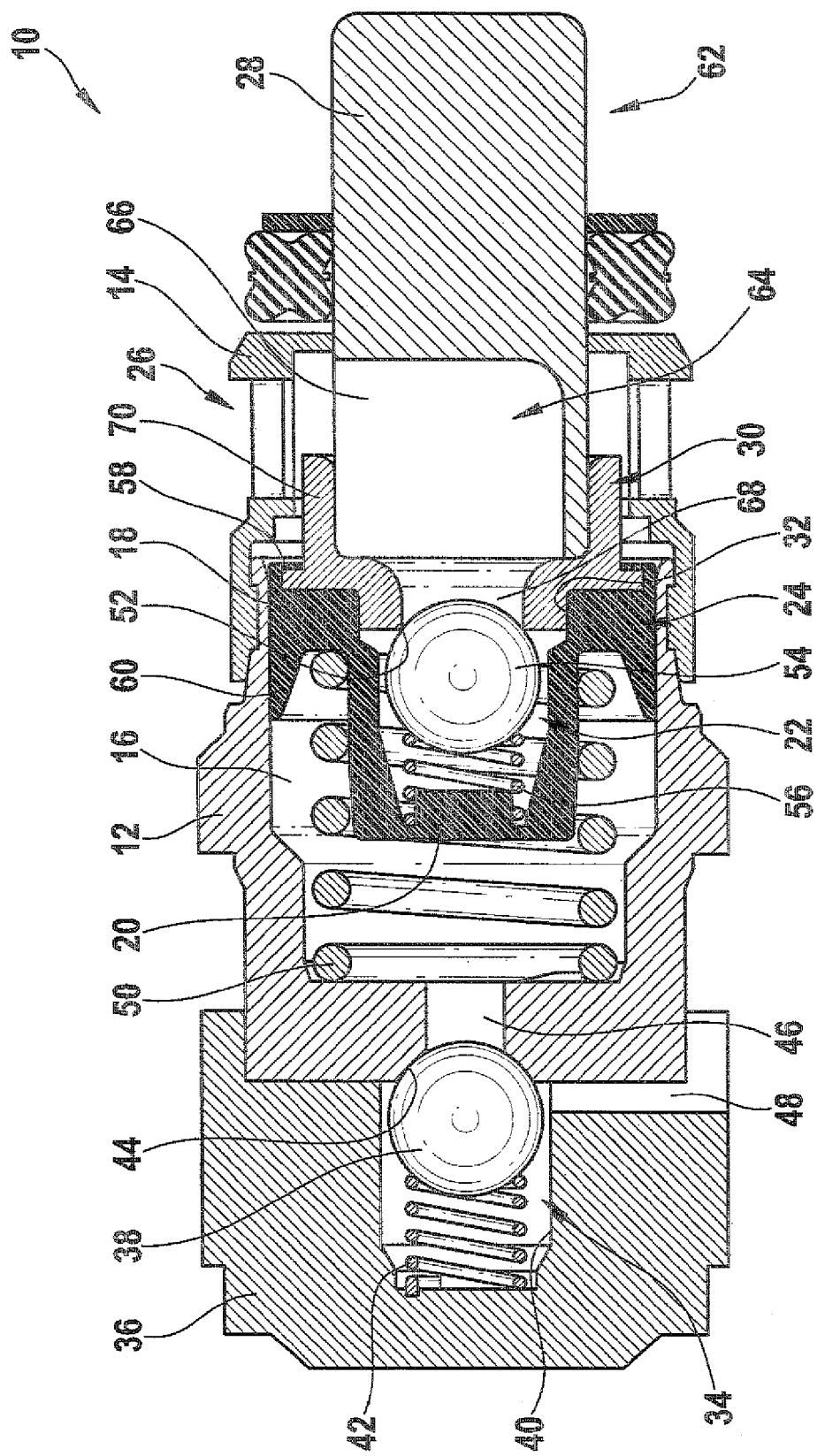
FIG. 1 shows a longitudinal section through a piston pump of the invention.

FIG. 1 shows a piston pump 10 according to the invention, which includes two housing portions 12 and 14; in the housing portion 12, a cylindrical bore 16 is embodied, in which a piston 26 is guided displaceably. The piston 26 includes a sealing element in the form of a sealing ring 18, a receiving means 20 for an inlet valve 22 embodied as a ball seat valve, and a piston rod 62, which adjoins the sealing ring 18. The piston rod 62 is embodied in two parts and includes two piston rod elements 28, 30; the piston rod element 28 is a longitudinally oriented piston rod portion and is received firmly by means of a press fit in the piston rod element 30 that forms a piston disk portion, in order to create a nonpositive connection between the two piston rod elements 28, 30. By the two-part embodiment of the piston rod 62 provided, a piston rod 62 that is economical to produce can be achieved, since an economical rodlike piston rod element 28 is connected to a piston rod element 30 that can be furnished very economically in the form of a plastic injection-molded part, turned part, cast part, or cold-formed part. In the piston rod element 28, a fluid introduction opening 64, described in more detail hereinafter, can also be embodied especially economically.

The receiving means 20 and the sealing ring 18 together form a one-piece valve cap/sealing ring combination 24. The piston rod element 30, for connecting the piston rod 62 to the sealing ring 18, is received in the sealing ring opening 32 of the sealing ring 18.

The piston pump 10 furthermore has an outlet valve 34, embodied as a ball seat valve, which is disposed inside an outlet valve cap 36, and the ball 38 of the ball seat valve 34 is guided in a receptacle 40 embodied in the outlet valve cap 36. The outlet valve cap 36 may be made in part by metal-cutting machining or cold-forming. A helical spring 42 braced on the cap bottom presses the ball 38 against a valve seat 44, which is embodied in the housing portion 12 of the piston pump 10 and adjoins an outlet hole 46 embodied in the housing portion 12. Brake fluid flowing from the outlet hole 46 through the outlet valve 34 flows via a radial conduit 48 between the outlet valve cap 36 and the housing portion 12 in the direction of the pump outlet (not shown).

In the cylindrical bore 16 embodied in the housing portion 12, a prestressing element in the form of a helical spring 50 is also disposed, which rests with one end on the sealing ring 18 and with the other end is braced on the bottom of the housing portion 12. The helical spring 50 is subject to initial tension, in order to press the two-part piston rod 62, via the sealing ring 18 on which the piston rod 62 rests with its face end disposed inside the piston pump 10, against the circumference of the eccentric element of an eccentric drive (not shown). Thus the outer face end of the piston rod element 28 can be kept constantly in contact with the eccentric element. Driving the eccentric element to rotate causes the entire piston 26 to execute an axially reciprocating stroke motion, which effects a delivery of brake fluid in a known manner.

The valve seat 52 of the ball inlet valve 22 is embodied as a sealing edge on its face end on the piston rod element 30. This embodiment according to the invention of the valve seat 52 on the piston rod element 30 of the piston rod 62, in combination with the one-piece embodiment, according to the invention, of the sealing ring 18 and the receiving means 20 in the form of the valve cap/sealing ring combination 24, has pronounced advantages.

For disassembling the piston pump 10, the piston rod element 30 received with a clearance fit in the sealing ring opening 32 should be pulled out of the sealing ring opening 32. The clearance fit provided according to the invention makes problem-free release of the piston rod element 30 from the sealing ring 18 possible. The individual components of the inlet valve 22, that is, the ball 54 and the helical spring 56, can then be easily removed from the receiving means 20. Finally, once the one-piece valve cap/sealing ring combination 24 is pulled out of the cylindrical bore 16, the helical spring 50 can be removed from the cylindrical bore 16. The assembly of the piston pump 10 is equally simple; the clearance provided makes unproblematic centering of the piston rod element 30 in the sealing ring opening 32 possible.

A snap connection in the form of a snap lug 58 is also embodied on the sealing ring 18 and embraces a shoulder embodied on the piston rod element 30. By means of the snap lug 58, the piston rod 62 can be retained on the sealing ring 18 during the assembly of the piston pump 10, and in particular during the mounting on the cylindrical bore 16, thus simplifying the assembly of the piston pump 10 of the invention substantially. The thus-attained retention function can alternatively be attained by means of a thermal deformation, after the valve cap/sealing ring combination 24 has been slipped onto the piston rod element 30. The snap lug 58 takes on only the described retention function that is advantageous for assembly purposes. During the operation of the piston pump 10, the spring force of the helical spring 50 assures that the valve cap/sealing ring combination 24, despite the clearance fit that is advantageous for assembly purposes, rests permanently on the piston rod element 30 in the axial direction. Moreover, the snap lug 58 has a protective effect between the cylindrical bore 16 and the piston rod element 30. A sealing lip 60 is also embodied on the sealing ring 18 of the valve cap/sealing ring combination 24 and closes off the cylindrical space between the piston 26 and the cylindrical bore 16 radially in pressure-tight fashion.

In the piston rod element 28, a fluid introduction opening 64, as a supply conduit portion, for introducing fluid into the interior of the piston 26 is provided, which in this case is in the form of a slit 66, radially open on one side, that extends in the axial direction. By means of the slit 66, fluid from outside the piston rod element 28 can flow with only very slight flow resistance into the interior of the piston 26. After flowing through the slit 66, the fluid flows into an axially extending opening 68, which is embodied in the piston rod element 30 and forms a further supply conduit portion and extends as far as the inlet valve 22. According to the invention, both the slit 66 and the opening 68 are made quite large, to minimize the flow resistance. The piston pump 10 of the invention can thus be filled quickly, and as a result, good pressure buildup dynamics can be attained.

The second piston rod element 30 partially covers the fluid introduction opening 64 in the axial direction of the piston 26. In this way, according to the invention, the flow course through the piston rod element 30 that forms a piston disk portion can be kept as short as possible, so as to create the least possible flow resistance. The first piston rod element 28 is retained by means of a press fit on the second piston rod element 30, at the portion 70 of the second piston rod element 30 that partly covers the fluid introduction opening 64.

In an alternative embodiment, not shown, the slit 66 penetrates the piston rod element 28 diametrically and thus once again makes very fast filling of the interior of the piston 26 possible. Also, the second piston rod element 30, with a covering portion 70, partially covers the slit 66 in the axial direction of the piston 26.

In a further alternative embodiment, also not shown, the fluid introduction opening 64 is configured in the form of a radial bore, diametrically penetrating the piston rod element 28, and an axial bore communicating with it in a fluid-carrying mariner. The radial bore is partly covered by a covering portion 70 of the piston rod element 30.

Figure 2:
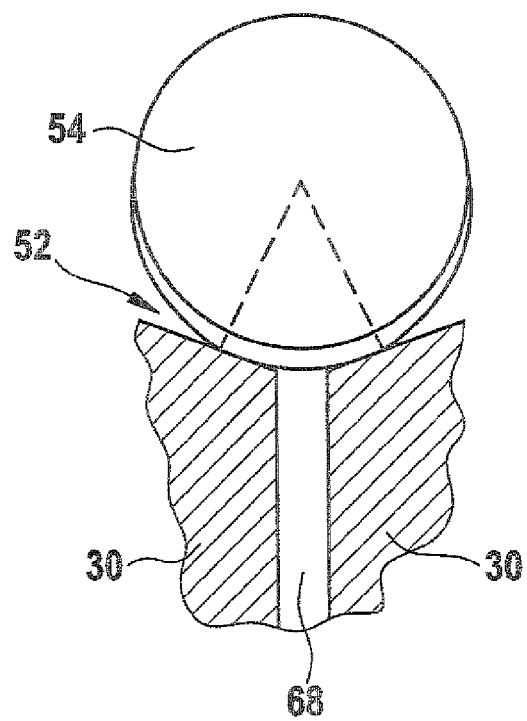
FIG. 2 is a basic sketch in the form of a longitudinal section through an inlet valve of a piston pump of the prior art.
Figure 3:
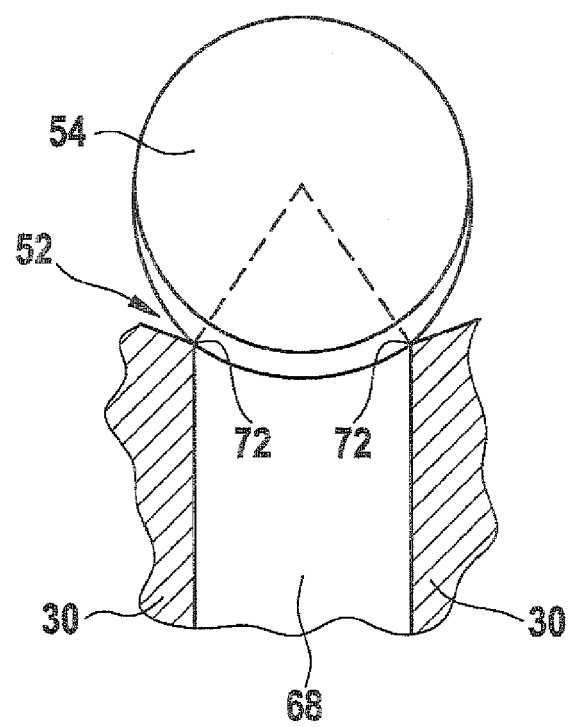
FIG. 3 shows the view as in FIG. 2 of a first exemplary embodiment of an inlet valve of a piston pump according to the invention.
Figure 4:
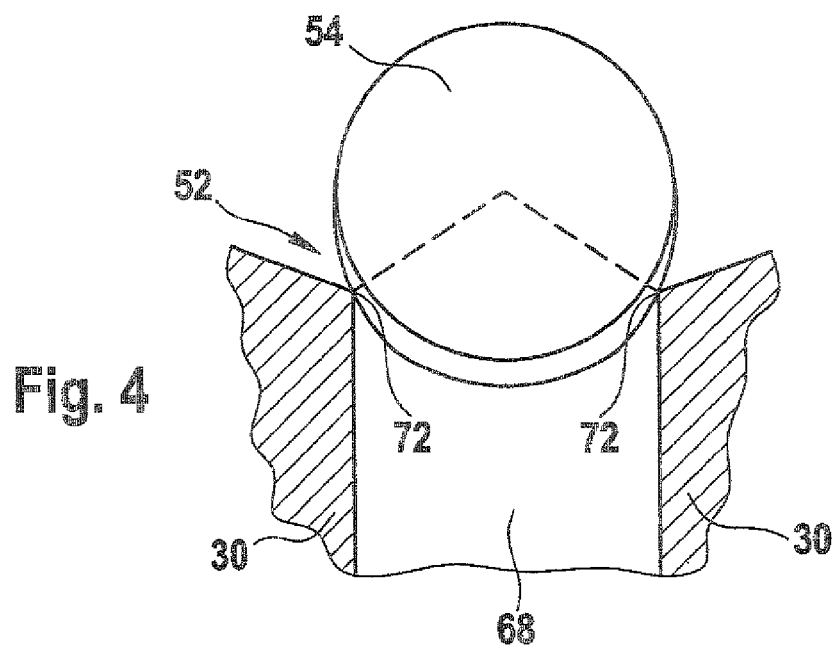
FIG. 4 shows the view as in FIG. 2 of a second exemplary embodiment of an inlet valve of a piston pump according to the invention.
Figure 5:
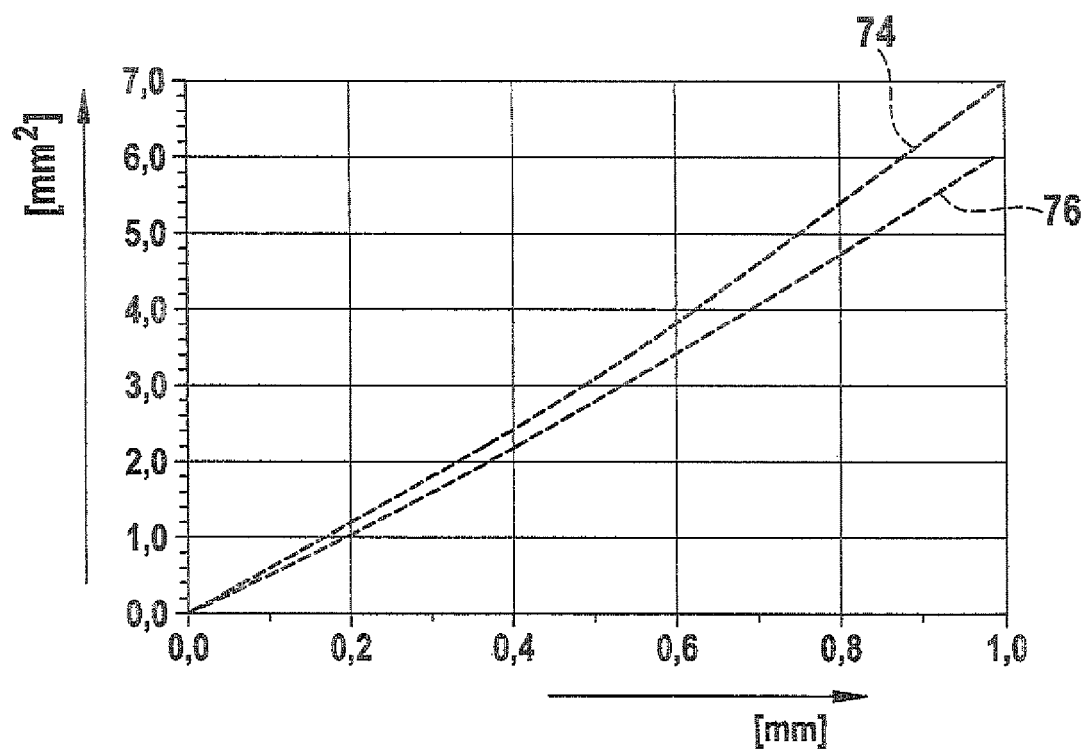
FIG. 5 is a graph which illustrates the dependency of the size of the area, through which fluid flows, at the inlet valve of FIGS. 3 and 4 on the diameter of the associated sealing seat opening.

In the piston pump 10 of FIG. 1, as noted, the sealing seat or valve seat 52 is also configured as a circular sealing edge 72, against which the ball 54 provides sealing, as a spherical valve body of the inlet valve 22. The diameter of the circular sealing edge 72 is 3.3 mm and is thus equal to approximately 83% of the diameter of the ball 54, which is 4 mm (see also FIG. 3). In an alternative embodiment, the diameter of the circular sealing edge 72 is 3.6 mm, for a diameter again of 4 mm for the ball 54 (see FIG. 4). With this kind of sealing of the ball 54 at the sealing edge 72, compared to the prior art (see FIG. 2), in which the ball of an inlet valve of the piston pump is sealed against a conical seat, the diameter of the opening 68 is comparatively large, and thus for the same ball stroke, the result is a lesser flow resistance for the inlet valve in this region. At the same time, the area through which fluid flows between the raised ball 54 and the sealing edge 72 (see FIG. 5) is comparatively large for the same ball stroke, so that less flow resistance occurs in this region as well. This is especially true for a diameter of 3.3 mm (see line 74 in FIG. 5) of the sealing edge 72, compared to a sealing edge 72 that has a diameter of 3.6 mm (see line 76 in FIG. 5).

The foregoing relates to the preferred exemplary embodiments of the invention, it being understood that other variants and embodiments thereof are possible within the spirit and scope of the invention, the latter being defined by the appended claims.

The invention claimed is:

1. A piston pump for a vehicle brake system, comprising:
a housing portion;
a piston that is guided displaceably in the housing portion; and
an inlet valve having a sealing valve seat embodied on the piston and having a spherical valve body, the sealing valve seat being configured as a circular sealing edge against which the spherical valve body provides sealing,
wherein the piston defines a fluid passage for brake fluid and is configured in two parts, wherein one part of the piston is a piston rod portion oriented toward an eccentric drive, and the second part of the piston is a piston disk portion which forms the circular sealing edge,
wherein the piston rod portion defines a longitudinally oriented first supply conduit portion of the fluid passage, said first supply conduit portion extending axially along a length of said piston rod portion and having a radial portion extending radially in direct fluid communication outside said piston rod portion,
wherein the piston disk portion defines a second supply conduit portion of the fluid passage adjoining the first supply conduit portion in a flow direction, said second supply conduit portion extending axially from said first supply conduit and forming said sealing edge at a face of said piston disk portion opposite said first supply conduit, and
further wherein said piston disk portion overlaps said piston rod portion and a portion of the radial portion of said first supply conduit radially outside said piston rod portion.

2. The piston pump as defined by claim 1, wherein:
a diameter of the circular sealing edge is configured as approximately X% of a diameter of the spherical valve body, and
wherein 75<X<90.

3. The piston pump as defined by claim 1, wherein said radial portion is co-extensive with said length of said first supply conduit portion.

4. The piston pump as defined by claim 1, wherein the first supply conduit portion of the fluid passage possesses a first cross-sectional area and the second supply conduit portion of the fluid passage possesses a second cross-sectional area, and the second cross-sectional area is smaller than the first cross-sectional area.

5. The piston pump as defined by claim 4, wherein the first supply conduit portion of the fluid passage includes an axial bore and at least one radial bore.

6. The piston pump as defined by claim 4, wherein the first supply conduit portion of the fluid passage includes a radially and axially extending slit.

* * * * *